United States Patent
Zhao et al.

(10) Patent No.: US 11,714,025 B1
(45) Date of Patent: Aug. 1, 2023

(54) PSEUDO-STATIC TEST DEVICE AND METHOD FOR SEISMIC BEHAVIOR OF CONNECTION JOINTS OF WALLBOARD

(71) Applicant: Chengdu University of Technology, Chengdu (CN)

(72) Inventors: Hua Zhao, Chengdu (CN); Weiguang Yuan, Chengdu (CN); Yongtao Gao, Chengdu (CN); Da Zheng, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/178,252

(22) Filed: Mar. 3, 2023

(30) Foreign Application Priority Data

Mar. 7, 2022 (CN) .......................... 202210214594.0

(51) Int. Cl.
    *G01M 7/02* (2006.01)
(52) U.S. Cl.
    CPC .................................... *G01M 7/02* (2013.01)
(58) Field of Classification Search
    CPC ............ G01M 7/02; G01M 7/00; G01M 7/04; G01M 7/06; G01M 7/027; G01M 7/025; G01M 7/022
    See application file for complete search history.

(56) References Cited

U.S. PATENT DOCUMENTS

| 4,783,999 A * | 11/1988 | Kimball .................. G01M 7/04 384/12 |
| 2013/0340511 A1* | 12/2013 | Miller ..................... G01G 19/07 177/136 |
| 2015/0185108 A1* | 7/2015 | Baek ...................... G01M 7/022 73/669 |
| 2017/0322109 A1* | 11/2017 | Canfield .................. G01M 7/02 |
| 2021/0215574 A1* | 7/2021 | Akutsu ................. G01M 7/027 |
| 2023/0032380 A1* | 2/2023 | Gilleman .............. E04G 21/169 |

FOREIGN PATENT DOCUMENTS

| CN | 101915648 A | 12/2010 |
| CN | 202110061 U | 1/2012 |
| CN | 102426133 A | 4/2012 |
| CN | 102840955 A | 12/2012 |

(Continued)

OTHER PUBLICATIONS

Libo Liu, "Study on Mechanical Performance of Modular Steel Structure Building Connection Joints", CNKI.

(Continued)

*Primary Examiner* — Suman K Nath (57) ABSTRACT

A pseudo-static test device and method for seismic behavior of connection joints of a wallboard. The device includes ground anchor holes, a support frame including a steel beam and two steel columns, and a test wallboard. A bottom plate of the steel beam is provided with at least two first connecting holes. A top plate each steel column is provided with a second connecting hole. A bottom plate of each steel column is provided with a third connecting hole. The bottom plate of the steel beam is provided with a connection joint assembly configured to hingedly or rigidly connect a top of the test wallboard to the steel beam. Each first connecting hole is connected to the second connecting hole through a flange assembly.

9 Claims, 8 Drawing Sheets

(56) References Cited

FOREIGN PATENT DOCUMENTS

| | | |
|---|---|---|
| CN | 202661344 U | 1/2013 |
| CN | 103398908 A | 11/2013 |
| CN | 104359764 A | 2/2015 |
| CN | 105067211 A | 11/2015 |
| CN | 105510059 A | 4/2016 |
| CN | 106092545 A | 11/2016 |
| CN | 106168536 A | 11/2016 |
| CN | 107525726 A | 12/2017 |
| CN | 107727343 A | 2/2018 |
| CN | 108088736 A | 5/2018 |
| CN | 108534974 A | 9/2018 |
| CN | 109357852 A | 2/2019 |
| CN | 209027755 U | 6/2019 |
| CN | 209027758 U | 6/2019 |
| CN | 110186746 A | 8/2019 |
| CN | 110793871 A | 2/2020 |
| CN | 111207900 A | 5/2020 |
| CN | 211085650 U | 7/2020 |
| CN | 111721121 A | 9/2020 |
| CN | 112067219 A | 12/2020 |
| CN | 112538872 A | 3/2021 |
| CN | 212963983 U | 4/2021 |
| CN | 112850539 A | 5/2021 |
| CN | 112985993 A | 6/2021 |
| CN | 113218780 A | 8/2021 |
| CN | 214574826 U | 11/2021 |
| JP | 2006337079 A | 12/2006 |

OTHER PUBLICATIONS

Xiaopeng Ren et al., "Experimental study on seismic performance of reinforced concrete frame structure with infill wall reinforced by thin steel plate shear wall", Building Structure, vol. 50, No. 20, 2020, pp. 103-108.

* cited by examiner

PSEUDO-STATIC TEST DEVICE AND METHOD FOR SEISMIC BEHAVIOR OF CONNECTION JOINTS OF WALLBOARD

CROSS-REFERENCE TO RELATED APPLICATIONS

This application claims the benefit of priority from Chinese Patent Application No. 202210214594.0, filed on Mar. 7, 2022. The content of the aforementioned application, including any intervening amendments thereto, is incorporated herein by reference in its entirety.

TECHNICAL FIELD

This application relates to static test, and more particularly to a pseudo-static test device and method for seismic behavior of connection joints of a wallboard.

BACKGROUND

The existing reinforced concrete-structure and steel-structure outer walls, especially the fabricated-structure outer walls, generally adopt a non-bearing wallboard as the building envelope system. The performances of the building envelope wallboard are directly associated with the seismic response of the whole building structure. As a key component to connect the outer wallboard to the main structure, the connection joint is directly related to the stiffness, stability, load-bearing capacity and seismic behavior of the whole building structure. In view of this, it is required to carry out the pseudo-static test on connection joints of the wallboard to evaluate the seismic behavior.

The existing pseudo-static test devices for the seismic behavior of the wallboard are predominated by the steel-frame loading device, in which the steel frame is connected to the wallboard, and the horizontal and vertical loads are applied to the steel frame through an actuator or jack. The frame and the wallboard are together subjected to the load. These test devices aim to study the seismic behavior of the whole frame system, and fail to accurately evaluate the seismic behavior of the connection joints between the wallboard and the frame.

SUMMARY

An objective of this application is to provide a pseudo-static test device and method for studying seismic behavior of connection joints of a wallboard to overcome the deficiencies in the prior art.

Technical solutions of this application are described as follows.

In a first aspect, this application provides pseudo-static test device for studying seismic behavior of connection joints of a wallboard, comprising:

a plurality of ground anchor holes distributed on a test site surface;

a support frame; and a test wallboard;

wherein the plurality of ground anchor holes comprise two first ground anchor holes and a second ground anchor hole;

the support frame comprises a steel beam and two steel columns; the steel beam is parallel to the test site surface; the two steel columns are parallel to each other, and are arranged between the steel beam and the test site surface; a bottom plate of the steel beam is provided with at least two first connecting holes; a top plate of each of the two steel columns is provided with a second connecting hole; a bottom plate of each of the two steel columns is provided with a third connecting hole;

the bottom plate of the steel beam is provided with a first connection joint assembly; and the first connection joint assembly is configured to hingedly or rigidly connect a top of the test wallboard to the steel beam;

in the case that each of the at least two first connecting holes is connected to the second connecting hole through a first flange assembly, the third connecting hole of one of the two steel columns and the third connecting hole of the other of the two steel columns are respectively connected to the two first ground anchor holes through a second flange assembly; and the steel beam, the two steel columns, the two first ground anchor holes together form a four-point hinged-connection structure.

In an embodiment, in case that each of the at least two first connecting holes is boltedly connected to the second connecting hole; the third connecting hole of one of the two steel columns and the third connecting hole of the other of the two steel columns are respectively boltedly connected to the two first ground anchor holes; the first connection joint assembly is configured to rigidly connect the top of the test wallboard to the steel beam, such that the steel beam, the two steel columns, the two first ground anchor holes together form a four-point rigid-connection structure.

In an embodiment, the support frame further comprises a detachable beam; two ends of the steel beam each have a detachable connecting part; and the detachable connecting part is configured for fixing to an end of the detachable beam;

a bottom plate of the detachable beam is provided with a plurality of fourth connecting holes and a second connection joint assembly; the plurality of fourth connecting holes are each configured for connection to the second connecting hole via a third flange assembly, so as to realize hinged connection between the detachable beam and each of the two steel columns, or for bolted connection to the second connecting hole, so as to realize rigid connection between the detachable beam and each of the two steel columns.

In an embodiment, each of the first flange assembly, the second flange assembly and the third flange assembly comprises an upper bearing, a lower bearing and a bolt;

the upper bearing comprises two first vertical mounting plates parallel to each other and a first horizontal mounting plate; the first horizontal mounting plate is fixed to a top end of each of the two first vertical mounting plates; the first horizontal mounting plate is configured for fixing to the steel beam, the two steel columns or the detachable beam;

the lower bearing comprises a second vertical mounting plate and a second horizontal mounting plate; the second horizontal mounting plate is fixed to a bottom end of the second vertical mounting plate; and the second horizontal mounting plate is configured for fixing to the two steel columns or the two first ground anchor holes; and a thickness of the second vertical mounting plate matches a spacing between the two first vertical mounting plates; a surface of each of the two first vertical mounting plates is provided with a first flange connecting hole; a surface of the second vertical mounting plate is provided with a second flange connecting hole; when the second vertical mounting plate is inserted between the two first vertical mounting plates, and first flange connecting holes and the second flange connecting hole are aligned, the bolt is configured to simultaneously connect the first flange connecting holes and the second flange connecting hole to form hinged points.

In an embodiment, the plurality of fourth connecting holes are distributed on the bottom plate of the detachable beam along a length direction of the detachable beam.

In an embodiment, the pseudo-static test device further comprises a clamp base; the clamp base is fixed to the second ground anchor hole; a bottom of the test wallboard is embedded in a clamp slot on the clamp base, and is configured to slide along the clamp slot.

In an embodiment, the bottom of the test wallboard is provided with a first mounting hole; two inner side walls of the clamp slot are each provided with a fifth connecting hole corresponding to the first mounting hole; and when the bottom of the test wallboard is embedded in the clamp slot on the clamp base, the fifth connecting hole is boltedly fixed to the first mounting hole.

In an embodiment, an upper end of the test wallboard is provided with a plurality of second mounting holes; the first connection joint assembly comprises a T-shaped connecting rod and a reinforcing rod; a top end surface of the T-shaped connecting rod is provided with a screw hole for connection to the bottom plate of the steel beam or the bottom plate of the detachable beam, and a lower end of the T-shaped connecting rod has a first U-shaped clamping portion; and an upper part of the reinforcing rod is connected to a vertical part of the T-shaped connecting rod through a rotating shaft, and a lower part of the reinforcing rod has a second U-shaped clamping portion; and the first U-shaped clamping portion and the second U-shaped clamping portion are configured to clamp the top of the test wallboard through the plurality of second mounting holes, and are hingedly connected to the top of the test wallboard.

In an embodiment, the steel beam, the detachable beam and the two steel columns are each axially provided with a plurality of reinforcement ribs.

In a second aspect, this application provides a pseudo-static test method using the pseudo-static test device mentioned above, comprising:

(S1) according to a standard of seismic acceleration, controlling a loading actuator to apply a load to the support frame; wherein the support frame is connected to the test wallboard; and (S2) recording a deformation of the test wallboard or a deformation of a connection joint between the test wallboard and the support frame under the load applied by the loading actuator.

Compared with the prior art, this application has the following beneficial effects.

In this application, the pseudo-static test device includes a plurality of ground anchor holes, a support frame and a test wallboard. The support frame is a fully-fabricated frame. A bottom plate of the steel beam is provided with at least two first connecting holes. A top plate of each of the two steel columns is provided with a second connecting hole. A bottom plate of each of the two steel columns is provided with a third connecting hole. The bottom plate of the steel beam is provided with a first connection joint assembly. and the first connection joint assembly is configured to hinged or rigidly connect a top of the test wallboard to the steel beam. In the case that each of the at least two first connecting holes is connected to the second connecting hole through a first flange assembly, and the third connecting hole of one of the two steel columns and the third connecting hole of the other of the two steel columns are respectively connected to the two first ground anchor holes of the plurality of ground anchor holes through a second flange assembly. The steel beam, the two steel columns, the two first ground anchor holes together form a four-point hinged-connection structure. In this state, the support frame itself is subjected to no force, and is configured to only transfer force. Consequently, when the horizontal force is applied to the support frame, the support frame is configured to directly transfer the horizontal force to the test wallboard or the connection joint assembly (that is, connecting joins of the wallboard), so as to accurately evaluate the seismic behavior of the test wallboard or the connection joints of the wallboard.

In the drawings, 1, test wallboard; 11 first mounting hole; 12, second mounting hole; 2, steel beam; 21, first connecting hole; 3, steel column; 31, second connecting hole; 32, third connecting hole; 41, T-shaped connecting rod; 42, reinforcing rod; 43, first connection joint assembly; 44, second connection joint assembly; 51, first vertical mounting plate; 52, first horizontal mounting plate; 53, second vertical mounting plate; 54, second horizontal mounting plate; 55, first flange connecting hole; 56, second flange connecting hole; 57, first flange assembly; 58, second flange assembly; 59, third flange assembly; 6, detachable beam; 61, fourth connecting hole; 7, clamp base; 8, first clamp slot; 91, first ground anchor hole; and 92 second ground anchor hole.

DETAILED DESCRIPTION OF EMBODIMENTS

The application will be described in detail below with reference to the accompanying drawings and embodiments to make the technical solutions clear and complete. Obviously, described below are merely some embodiments of the application, and are not intended to limit the application. Other embodiments obtained by those of ordinary skill in the art based on the embodiments provided herein without paying creative effort shall fall within the scope of the present application defined by the appended claims.

In order to solve the technical problems mentioned above, this application provides a pseudo-static test device and method for seismic behavior of connection joints of a wallboard, which enables accurate evaluation on seismic behavior of the test wallboard 1 or connection joints of the wallboard. In addition, the pseudo-static test device provided herein is employed to simulate the state of the connecting system between the wallboard and main frame under seism through different fabrication ways, so as to study the seismic behavior of the wallboard and wallboard system. In this way, the test device can study the full-series seismic behaviors from the wallboard, the connection joints of the wallboard and the wallboard system.

Figure 1:
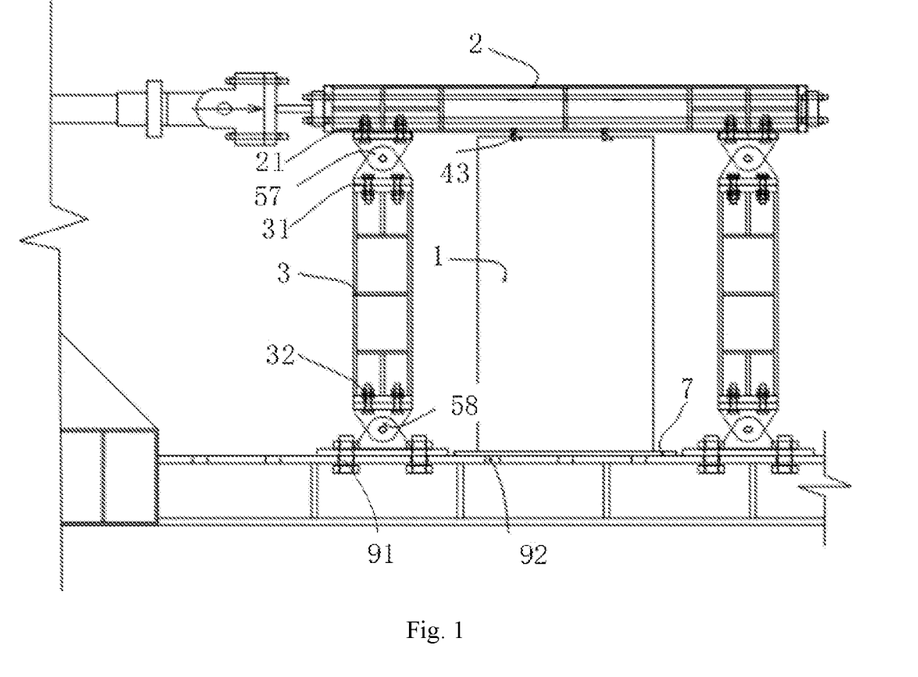
FIG. 1 is a structural diagram of a pseudo-static test device for seismic behavior of connection joints of a wallboard according to an embodiment of this application.

Specifically, FIG. 1 is a structural diagram of a pseudo-static test device for seismic behavior of connection joints of a wallboard according to an embodiment of this application. As shown in FIG. 1, the pseudo-static test device for seismic behavior of connection joints of a wallboard includes a plurality of ground anchor holes distributed on a test site surface, a support frame and a test wallboard 1. The plurality of the ground anchor holes include two first ground anchor holes 91 and a second ground anchor hole 92. The support frame includes a steel beam 2 and two steel columns 3. The steel beam 2 is parallel to the test site surface. The two steel columns 3 are parallel to each other, and are arranged between the steel beam 2 and the test site surface. A bottom plate of the steel beam 2 is provided with at least two first connecting holes 21. A top plate of each of the two steel columns 3 is provided with a second connecting hole 31. A bottom plate of each of the two steel columns 3 is provided with a third connecting hole 32. The bottom plate of the steel beam 2 is provided with a first connection joint assembly 43. The first connection joint assembly 43 is configured to hingedly or rigidly connect a top of the test wallboard 1 to the steel beam 2. In the case that each of the at least two first connecting holes 21 is connected to the second connecting hole 31 through a first flange assembly 57, the third connecting hole of one of the two steel columns and the third connecting hole of the other of the two steel columns are respectively connected to the two first ground anchor holes 91 through a second flange assembly 58; and the steel beam, 2 the two steel columns 3, the two first ground anchor holes 91 together form a four-point hinged-connection structure.

In some embodiments of this application, a rigid connection refers to a connection that is capable of transferring not only vertical action and horizontal action, but also rotating torque between the components. A hinged connection means that two components are connected to each other through a hinge, and the two components are relatively rotatable to each other.

In this application, the steel beam 2 is connected to the two steel columns 3 to form a support frame. In the case that each of the at least two first connecting holes 21 on the bottom plate of the steel beam 2 is correspondingly connected to the second connecting hole 31 on each of the two steel columns 3 through a first flange assembly 57, so as to realize a hinged connection between the steel beam 2 and the two steel columns 3, that is, two hinged points are formed between the steel beam 2 and the two steel columns 3. The third connecting hole 32 of one of the two steel columns 3 and the third connecting hole 32 of the other of the two steel columns 3 are respectively connected to the two first ground anchor holes 91 through a second flange assembly 58, so as to realize a hinged connection between the two steel columns 3 and the two first ground anchor holes 91. Since there are two steel columns, two hinged points are formed between the two steel columns 3 and the two first ground anchor holes 91, so as to form the four-point hinged-connection structure provided in this application. Since the support frame is a hinged structure, the support frame is subjected to no force, and only configured to only transfer force. Consequently, when the horizontal force is applied to the support frame, the support frame is configured to directly transfer the force to the test wallboard 1 or the connections (namely, connection joints of the wallboard) between the first connection joint assembly 43 and the test wallboard 1, so as to accurately evaluate the seismic behavior of the test wallboard 1 or the connection joints of the wallboard. In this embodiment, when the top of the test wallboard 1 is hingedly connected to the steel beam 2 through the first connection joint assembly 43 on the bottom plate of the steel beam 2, the force exerted on the support frame is transferred to the connection joints of the wallboard, such that the seismic behavior of the connection joints of the wallboard can be accurately evaluated. When the top of the test wallboard 1 is rigidly connected to the steel beam 2 through the first connection joint assembly 43, the force exerted on the support frame is transferred to the test wallboard 1, such that the seismic behavior of the test wallboard 1 can be accurately evaluated. How a flange assembly realizes the hinged connection between the two holes and the structure of the connection joint assembly are described below in detail. Reference may be made to the relevant prior art for the structure of each of the plurality of ground anchor holes.

In this application, the support frame provided herein is fully fabricated. Namely, the connection between the steel beam 2 and the two steel columns 3, the connections between the two steel columns 3 and the two first ground anchor holes 91 and the connection between the first connection joint assembly 43 and the test wallboard 1 can be realized through rigid or hinged connection according to the actual test requirements.

In an embodiment of this application, in case that each of the at least two first connecting holes 21 is boltedly connected to the second connecting hole 31. The third connecting hole 32 of one of the two steel columns 3 and the third connecting hole 32 of the other of the two steel columns 3 are respectively boltedly connected to the two first ground anchor holes 91. The first connection joint assembly 43 is configured to rigidly connect the top of the test wallboard 1 to the steel beam 2. The rigid connection between the steel beam 2, the two steel columns 3, the rigid connections between the two steel columns 3 the two first ground anchor holes 91 are realized, such that the steel beam 2 and the two steel columns 3, the two first ground anchor holes 91 together form a four-point rigid-connection structure. In this way, the support frame is a rigid-connection frame. When external force is exerted on the support frame, the support frame is subjected to the external force, and configured to transmit the force to the test wallboard 1 through the connection joints. In this state, the support frame is not only a force-transmitting object, but also a force-bearing device. The support frame and the test wallboard 1 and the connection joints of the wallboard are subjected to the force, which can be employed to the study of the seismic behavior of the wallboard system.

Figure 2:
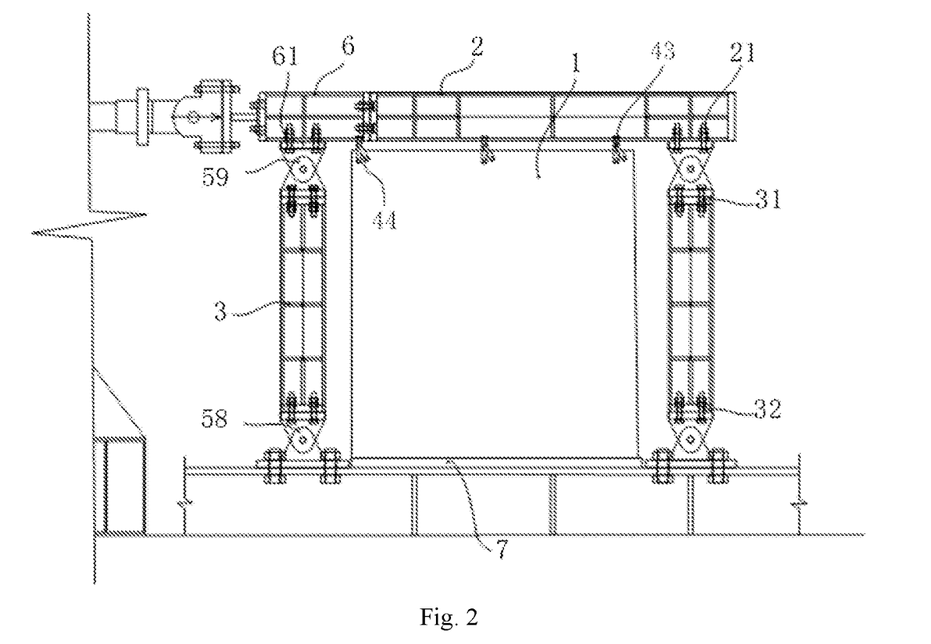
FIG. 2 is a structural diagram of the pseudo-static test device according to another embodiment of this application.

Referring to an embodiment shown in FIG. 2, the support frame further includes a detachable beam 6. Two ends of the steel beam 2 each have a detachable connecting part. The detachable connecting part is configured for fixing to an end of the detachable beam 6. A bottom plate of the detachable beam 6 is provided with a plurality of fourth connecting holes 61 and a second connection joint assembly 44. The second connection joint assembly 44 includes a T-shaped connecting rod 41 and a reinforcing rod 42. The plurality of fourth connecting holes 61 are each configured for connecting to the second connecting hole 31 via a third flange assembly 59 or for bolted connection to the second connecting hole 31, so as to realize a hinged connection or a rigid connection between the detachable beam 6 and each of the two steel columns 3, respectively. In this embodiment, the two steel columns 3 are parallel to each other. By connecting the two steel columns 3 to the two first ground anchor holes 91 distributed on the test site surface, the distance between the two steel columns 3 is adjustable. The detachable beam 6 is an extension member of the steel beam 2. The detachable beam 6 is configured to be fixed to the detachable connecting part of at least one of two opposite ends of the steel beam 2, so that the detachable beam 6 is configured as a part of the steel beam 2 to extend the steel beam 2. Since the bottom plate of the detachable beam 6 is provided with the plurality of fourth connecting holes 61 and the second connection joint assembly 44, the detachable beam 6 is fabricated to be hingedly or rigidly connected to the two steel columns 3 through the third flange assembly 59, or rigidly connected to the two steel-frame columns 3 by bolts. The steel beam 2 is configured to be matched to one or two detachable beams 6. The frames can be assembled into different sizes by different combinations of the two steel columns 3, the steel beam 2 and the detachable beam 6, so as to be applied to the forms of single-piece wallboard fabrication and multiple-piece wallboard fabrication, thereby realizing the connection with test wallboards 1 of different sizes for different research subjects under research conditions. After hingedly or rigidly connected to the plurality of ground anchor holes, the support frame is configured to work in cooperation with other components in the pseudo-static test device, which enables effective evaluation of seismic behavior of the test wallboard 1, or seismic behavior of the connection joints of the test wallboards 1 of different sizes under seismic action. It should be noted that the structural diagram of the pseudo-static test device for connection joints of the wallboard shown in each of FIGS. 1-2 should further include a reaction wall, a reaction frame, a jack, a seismic simulation actuator, etc., which are not shown in FIGS. 1-2, because they are not the focus this application.

Figure 3:
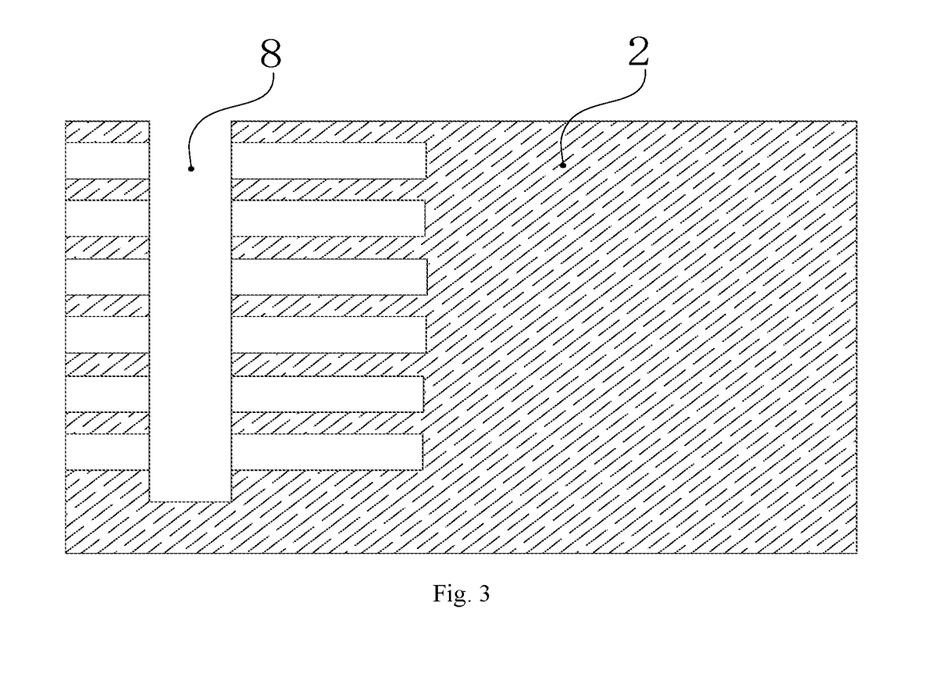
FIG. 3 is a structural diagram of a detachable connecting part according to an embodiment of this application.

Referring to an embodiment shown in FIG. 3, the detachable connecting part includes a first clamp slot 8. Three surfaces of the first clamp slot 8 are all openings. Two side walls of the first clamp slot 8 are each provided with a plurality of third mounting holes. An end portion of the detachable beam 6 is provided with a second clamp slot (not shown in figures). Two side walls of the second clamp slot are each provided with a plurality fourth mounting holes (not shown in figures). The plurality of third mounting holes are in one-to-one correspondence with the plurality fourth mounting holes. When the first clamp slot 8 clamps the second clamp slot, the plurality of third mounting holes are correspondingly connected to the plurality fourth mounting holes through bolts and nuts. The inner wall surface of the first slot 8 or the second slot is provided with rubber pads. In the above-mentioned structure, a feasible structure for the detachable connecting part is provided herein. The feasible structure has a connection way realized by clamping connection and screw connection, which enables high fixation between one end of the detachable beam 6 and the steel beam 2, and has high stability and strong fastening property. The feasible structure is suitable for the pseudo-static test for seismic behavior under a test strength.

In an embodiment of this application, a plurality of fourth connecting holes 61 are distributed on the bottom plate of the detachable beam 6 along a length direction of the detachable beam 6. Under this setting, one of the two steel columns 3 is configured to be fixed to any one of the plurality of fourth connecting holes 61 on the detachable beam 6, so that the spacing between two steel columns 3 can be adjusted more finely. In addition, the stepless adjustment of the spacing between two steel columns 3 can be realized, such that the pseudo-static test device can be more suitable for the pseudo-static test for seismic behavior of the wallboards of different sizes.

Figure 4A:
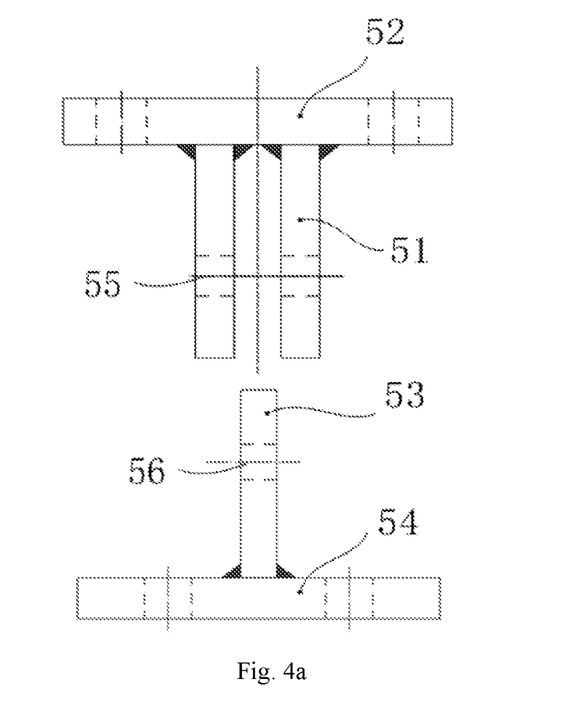
FIG. 4a is a left side view of a flange assembly according to an embodiment of this application.
Figure 4B:
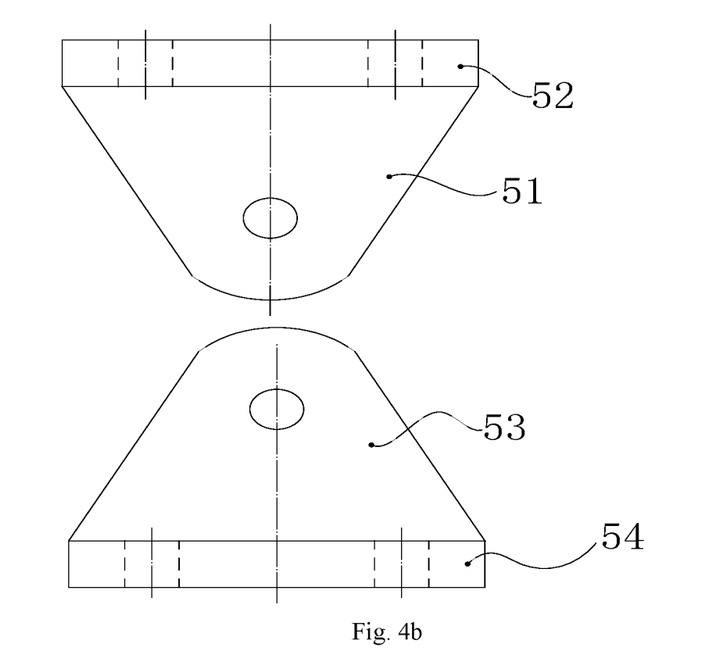
FIG. 4b is a front view of the flange assembly according to an embodiment of this application.

Referring to embodiments shown in FIGS. 4a-4b, the first flange assembly 57, the second flange assembly 58 and the third flange assembly 59 each include an upper bearing, a lower bearing and a bolt. The upper bearing includes two first vertical mounting plates 51 parallel to each other and a first horizontal mounting plate 52. The first horizontal mounting plate 52 is fixed to a top end of each of the two first vertical mounting plates 51. The first horizontal mounting plate 52 is configured for fixing to the steel beam 2, the two steel columns 3 or the detachable beam 6. The lower bearing includes a second vertical mounting plate 53 and a second horizontal mounting plate 54. The second horizontal mounting plate 54 is fixed to a bottom end of the second vertical mounting plate 53. The second horizontal mounting plate 54 is configured for fixing to the two steel columns 3 or the two first ground anchor holes 91. In this embodiment, the first horizontal mounting plate 52 is provided with one or more screw holes. The second horizontal mounting plate 54 is provided with one or more screw holes. In this embodiment, the first flange assembly 57 is configured for connecting the steel beam 2 to the two steel columns 3. The second flange assembly 58 is configured to connect the two steel columns 3 and the two ground anchor holes 91. The third flange assembly 59 is configured to connect the detachable beam 6 to one of the two steel columns 3. Thus, screw holes on the first horizontal mounting plate 52 are boltedly fixed to the at least two first connecting holes 21 on the bottom plate of the steel beam 2, so as to realize the rigid connection between the upper bearing and the steel beam 2. Or, the screw holes on the first horizontal mounting plate 52 are boltedly fixed to the fourth connecting holes 61 on the bottom plate of the detachable beam 6, so as to realize the rigid connection between the upper bearing and the detachable beam 6. Or, the screw holes on the first horizontal mounting plate 52 are boltedly fixed to the third connecting holes 32 on the bottom plate of each of the two steel columns 3, so as to realize the rigid connection between the upper bearing and the two steel columns. Similarly, in this embodiment, screw holes on the second horizontal mounting plate 54 are boltedly fixed to the second connecting holes 31 on the bottom plate of each of the two steel columns 3, so as to realize the rigid connection between the lower bearing and the two steel columns 3. Or, the screw holes on the second horizontal mounting plate 54 are boltedly fixed to the two first ground anchor holes 91, so as to realize the rigid connection between the lower bearing and the two first ground anchor holes 91. Subsequently, since a thickness of the second vertical mounting plate 53 matches a spacing between the two the first vertical mounting plates 51, a surface of each of the two first vertical mounting plates 51 is provided with a first flange connecting hole 55, a surface of the second vertical mounting plate 53 is provided with a second flange connecting hole 56. When the second vertical mounting plate 53 is inserted between the two first vertical mounting plates 51, and the first flange connecting hole 55 and the second flange connecting hole 56 are aligned, the bolt is configured to simultaneously connect the first flange connecting holes 55 and the second flange connecting hole 56 to form hinged-connection points.

In another embodiment of this application, unlike the above-mentioned embodiments, the upper bearing includes two first vertical mounting plates 51 parallel to each other and a first horizontal mounting plate 52. The first horizontal mounting plate 52 is fixed to a top end of each of the two first vertical mounting plates 51. The first horizontal mounting plate 52 is configured for fixing to the two steel columns 3 or the plurality of ground anchor holes. The lower bearing includes a second vertical mounting plate 53 and a second horizontal mounting plate 54. The second horizontal mounting plate 54 is fixed to a bottom end of the second vertical mounting plate 53. The second horizontal mounting plate 54 is configured for fixing to the steel beam 2, the two steel columns 3 or the detachable beam 6.

As can be seen from the above-mentioned embodiments, the first connection joint assembly 43 and the second connection joint assembly 44 are configured to hingedly or rigidly connect the top of the test wallboard 1 and the steel beam 2. The corresponding support frame is in the four-point hinged-connection state. In this embodiment, the seismic behavior of the connection joints of the wallboard or the test wallboards 1 of different sizes are accurately evaluated. On this basis, the bottom of the wallboard is restrained to study the effect of different methods for restraining the bottom of the wallboard on the performance of the connection joints of the wallboard or test wallboards 1 of different sizes. As shown in FIGS. 1-2, the pseudo-static test device further includes a clamp base 7. The clamp base 7 is fixed to the second ground anchor hole 92. The bottom of the test wallboard 1 is embedded in a third clamp slot on the clamp base 7. The bottom of the test wallboard 1 is configured to slide along the third clamp slot on the clamp base 7, so as to simulate a sliding connection of the wallboard. In this way, when the bottom of the test wallboard 1 is movable, the seismic behavior of the connection joints of the wallboard or the test wallboard 1 can be studied.

Figure 6:
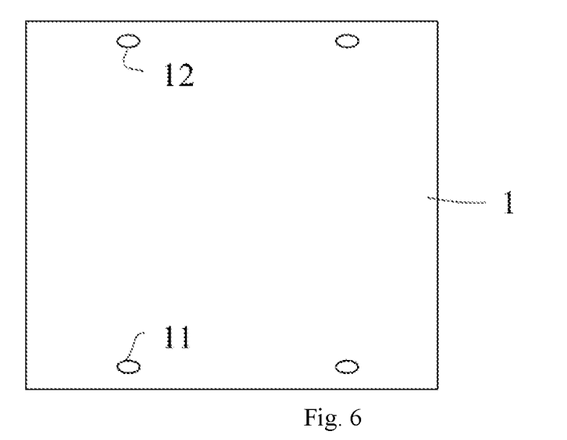
FIG. 6 is a front view of the wallboard.

In another embodiment of this application, as shown in FIG. 6, the bottom of the test wallboard 1 is provided with a first mounting hole 11. Two inner side walls of the third clamp slot are each provided with a fifth connecting hole corresponding to the first mounting hole 11. When the bottom of the test wallboard 1 is embedded in the third clamp slot on the clamp base 7, the fifth connecting hole of each of the two inner side walls of the third clamp slot is boltedly fixed to the first mounting hole 11. Under this structure, the fixing connection way of wallboard can be simulated. When the bottom of the test wallboard 1 is not able to move, the seismic behavior of the connection joints of the wallboard or the test wallboard 1 can be studied. In this embodiment, the clamp base 7 can be a recess, whose two ends are communicated. Two opposite plate surfaces of the recess are each provided with a plurality of fifth connecting holes. A bottom end of the recess extends outward and provided with mounting panels. The mounting panels are configured for fixing to the plurality of ground anchor holes by welding or screwing, etc. When the bottom of the test wallboard 1 is clamped into the recess, bolts are configured to pass through one side the recess, the test wallboard 1, the other side of the recess in turn, and then fixed with nuts. Or, the clamp base 7 can be two "L" shaped baffles. Each of the two "L" shaped baffles includes an upper baffle and a lower baffle. The upper baffle and the lower baffle are mutually perpendicular to each other. Each of the upper baffle and the lower baffle is provided with a plurality of fifth connecting holes. After the lower part of the wallboard is clamped between the two "L" shaped baffles, bolts are configured to pass through the plurality of fifth connecting hole on one of the two "L" shaped baffles, test wallboard 1, the plurality of fifth connecting holes on the other of the two "L" shaped baffles, and then fixed with nuts. The lower baffles of the two "L" shaped baffles are fixed to the plurality of ground anchor holes by welding or screwing.

Figure 5:
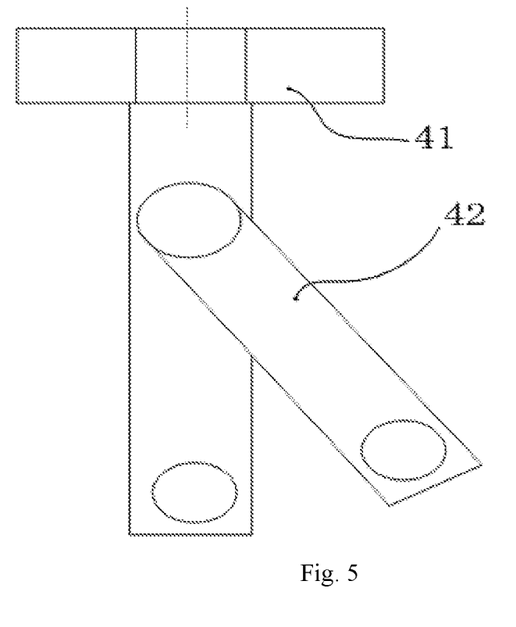
FIG. 5 is a structural diagram of a connection joint assembly according to an embodiment of this application.

Referring to an embodiment shown in FIG. 5, a structure that can simultaneously meet the requirement of hinged connection or rigid connection between the top of the test wallboard 1 and the steel beam 2 (or detachable beam 6) is provided. In the structure shown in FIG. 6, the top of the test wallboard 1 is provided with a plurality of second mounting holes 12, the first connection joint assembly 43 and the second connection joint assembly 44 each include a T-shaped connecting rod 41 and a reinforcing rod 42. A top end surface of the T-shaped connecting rod 41 is provided with a screw hole for connection to the bottom plate of the steel beam 2 or the bottom plate of the or detachable beam 6. A lower end of the T-shaped connecting rod 41 has a first U-shaped clamping portion. An upper part of the reinforcing rod 42 is connected to a vertical part of the T-shaped connecting rod 41 through a rotating shaft, and a lower part of the reinforcing rod 42 has a second U-shaped clamping portion. The first U-shaped clamping portion and the second U-shaped clamping portion are configured to clamp the top of the test wallboard 1, and are hingedly connected to the plurality of second mounting holes 12. In this embodiment, both two inner sides of each of the first U-shaped clamping portion and the second U-shaped clamping portion are each provided with a corresponding hole. When the first U-shaped clamping portion and the second U-shaped clamping portion are configured to clamp the top of the test wallboard 1, the bolt is configured to pass through the holes on the two inner sides and the second mounting holes 12 on the top of the test wallboard 1 to realize the hinged connection of the top of the test wallboard 1. During installation, when the top of the test wallboard 1 is clamped by only the first U-shaped clamping portion of the T-shaped connecting rod 41, the hinged connection between the first connection joint assembly 43 and the top of the test wallboard 1, and the hinged connection between the second connection joint assembly 44 and the top of the test wallboard 1 can be realized. When the top of the test wallboard 1 is clamped by the first U-shaped clamping portion on the T-shaped connecting rod 41 and the second U-shaped clamping portion of the reinforcing rod 42 simultaneously, the T-shaped connecting rod 41, the reinforcing rod 42 and the upper surface of the test wallboard 1 form a triangular reinforcement structure, so that the top of the test wallboard 1 is no longer configured to move, such that the rigid connection between the top of the test wallboard 1 and the first connection joint assembly 43 and the second connection joint assembly 44 is realized. Moreover, the triangular reinforcement structure is simple and operable, and the necessary components are excessively fragmentary.

In an embodiment of this application, the steel beam 2, the detachable beam 6 and the two steel columns 3 are each axially provided with a plurality of reinforcement ribs. By providing the reinforcement ribs, the strength of the overall structure of each of the steel beam 2, the detachable beam 6 and the two steel columns 3 can be enhanced. In this embodiment, the steel beam 2, the detachable beam 6 and the two steel columns 3 may all be made of I-shaped beam.

In conclusion, the pseudo-static test device for seismic behavior of connection joints of a wallboard provided herein has the following structural features.

(1) The frame size and test space of the test device can be adjusted by the connection between the beam and the detachable beam 6, which are illustrated as follows.

A: Steel beam 2 connection I: only the steel beam 2 is used as the frame beam to form a loading frame with a lateral available size of 1050 mm.

B: Steel beam 2 connection II: the positions of the holes in the end plates at both ends of steel beam 2 correspond to the positions of the holes in the end plates of detachable beam 6, and the holes in the end plates at both ends of steel beam 2 are correspondingly fixed to the holes in the end plates of detachable beam 6 through bolts to lengthen the steel beam 2, so as to form a support frame with a transverse available size of 2050 mm. Thus, the test device can be employed for the components with sizes ranging from 1050 mm*1400 mm to 2050 mm*1400 mm.

(2) Different beam-column connection conditions can be formed by different connections between the two steel columns 3, the steel beam 2 (the detachable beam 6) and flange assemblies.

C: Beam-column connection I: the top end plate of each of the two steel columns 3 is connected to the bottom plate of steel beam 2 (detachable beam 6) by bolts and the first flange assembly 57 (the third flange assembly 59); the beam-column connection joint form a hinged connection.

D: Beam-column connection II: the top end plate of each of the two steel columns 3 is directly bolted to the bottom plate of steel beam 2 (detachable beam 6); the beam-column connection joint form a rigid connection.

(3) Different column-end constraints can be formed by different ways among the two steel columns 3, the two first ground anchor holes 91, the first flange assembly 57, the second flange assembly 58 and the third flange assembly 59.

E: Column-end connection I: the bottom end plate of each of the two steel columns 3 is connected to one of the two first ground anchor holes 91 by bolts and the second flange assembly 58; and the lower end connection joint of the one of the two steel columns forms a hinged connection.

F: Column-end connection II: the bottom end plate of each of the two steel columns 3 is boltedly connected to one of the two first ground anchor holes 91 by bolts; and the lower end connection joint of the one of the two steel columns form a rigid connection.

(4) The lower end of the wallboard is connected to the clamp base 7 in the following way.

G: The lower end of the wallboard is embedded in the clamp base 7 to simulate the sliding connection of the wallboard.

H: The lower end of the wallboard and the corresponding position of the clamp base 7 are respectively provided with holes and are boltedly connected to each other to simulate the fixation of the wallboard.

Based on the different connections between the steel beam 2, detachable beam 6 and the two steel columns 3, different constraints of the pseudo-static test device provided herein are formed, and thus the pseudo-static test device is applicable to different research objects and meets different research objectives, which are described as follows.

Assembly method I: Connection (A/B)+C+E+(G/H)

Features: the support frame is a hinged frame; the support frame itself is subjected to no force, and is configured as a loading device to transmit force. When the external force is exerted on the support frame, the support frame is configured to transmit the force to the connection joints, so as to accurately evaluate the seismic behavior of the connection joints of the wallboard; in addition, when the connection joint is in rigid connection with the frame, the seismic behavior of the test wallboard 1 can be studied.

In the study of the seismic behavior of the connection joint, A connection is generally used. In the study of the seismic behavior of wallboard, A connection or B connection can be used to apply to wallboards of different sizes. G connection and H connection can be used to study the effect of different restraint methods on seismic behavior of the connection joint at the lower end of the wallboard.

Assembly mode II: connection mode B+D+F+H

Features: the support frame is a rigid frame; when the external force is exerted on the frame, the frame is subjected to no force, and configured to transmit the force to the wallboard through the connection joint; the support frame is both a force-bearing body and a force-transmitting device. When the external force is exerted on the frame, the frame, the wallboard and the connection joints are connection jointly stressed, which can be used to study the seismic behavior of the wallboard system.

Based on the same concept, a pseudo-static test method using the above-mentioned pseudo-static test device is provided herein. Referring to an embodiment shown in FIG. 7, the pseudo-static test method is performed as follows.

Figure 7:
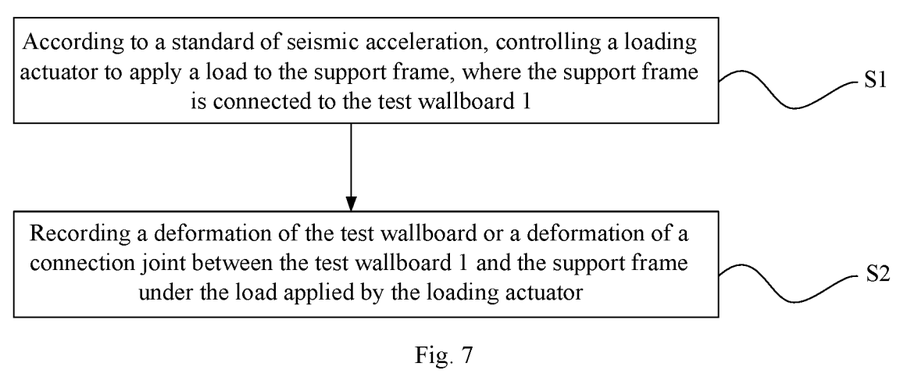
FIG. 7 is a flow chart of a pseudo-static test method according to an embodiment of this application.

(S1) According to a standard of seismic acceleration, a loading actuator is controlled to apply a load to the support frame, where the support frame is connected to the test wallboard 1.

(S2) A deformation of the test wallboard 1 or a deformation of a connection joint between the test wallboard 1 and the support frame under the load applied by the loading actuator are recorded.

In the test method provided herein, the standard of seismic acceleration can be referred to the standard in the relevant prior art, which is not limited herein. After each loading force is applied, the deformation of the test wallboard 1 or the deformation of a connection joint between the test wallboard 1 and the support frame under such load are recorded. The specific way of recording the deformation can be referred to the relevant prior art and is limited herein.

Individual embodiments in this disclosure are described in a progressive manner. Individual embodiments focus on the differences from other embodiments, and the same or similar parts between individual embodiments can be referred to each other.

It should be noted that as used herein, relational terms such as "first" and "second" are merely intended to distinguish one entity or operation from another, and do not have to require or imply any actual relationships or order among these entities or operations. Additionally, the term "and/or" in the disclosure indicates that either or both of the elements may be selected. Moreover, the term such as "include", "comprise" or any other variation thereof is intended to contain non-exclusive inclusion, so as to allow a process, method, article or terminal device that includes a set of elements to include not only those elements, but also other elements not expressly illustrated, or the elements inherent to the process, method, article or terminal device. Without further limitation, the elements defined by the recitation "including a " do not preclude the existence of additional identical elements in the process, method, article or terminal device that includes the elements.

A pseudo-static test device and method for seismic behavior of connection joints of a wallboard has been illustrated in detail above. The inventive principles and the implementation of this application are described with reference to the embodiments. Described above are merely intended to facilitate the understanding of the technical solutions of this application, and not to limit this application. In addition, it should be understood that any changes, modifications and replacements made by those skilled in the art without departing from the spirit of the application shall fall within the scope of the present application defined by the appended claims.

What is claimed is:

1. A pseudo-static test device for seismic behavior of connection joints of a wallboard, comprising:
   a plurality of ground anchor holes distributed on a test site surface;
   a support frame; and
   a test wallboard;

wherein the plurality of ground anchor holes comprise two first ground anchor holes and a second ground anchor hole;

the support frame comprises a steel beam and two steel columns; the steel beam is parallel to the test site surface; the two steel columns are parallel to each other, and are arranged between the steel beam and the test site surface; a bottom plate of the steel beam is provided with at least two first connecting holes; a top plate of each of the two steel columns is provided with a second connecting hole; a bottom plate of each of the two steel columns is provided with a third connecting hole;

the bottom plate of the steel beam is provided with a first connection joint assembly; and the first connection joint assembly is configured to hingedly or rigidly connect a top of the test wallboard to the steel beam;

in the case that each of the at least two first connecting holes is connected to the second connecting hole through a first flange assembly, and the third connecting hole of one of the two steel columns and the third connecting hole of the other of the two steel columns are respectively connected to the two first ground anchor holes through a second flange assembly, the steel beam, the two steel columns, the two first ground anchor holes together form a four-point hinged-connection structure;

the pseudo-static test device further comprises a clamp base; the clamp base is fixed to the second ground anchor hole; a bottom of the test wallboard is embedded in a clamp slot on the clamp base, and is configured to slide along the clamp slot, so as to simulate sliding connection of a wallboard;

an upper end of the test wallboard is provided with a plurality of first mounting holes; the first connection joint assembly comprises a T-shaped connecting rod and a reinforcing rod; a top end surface of the T-shaped connecting rod is provided with a screw hole for connection to the bottom plate of the steel beam, and a lower end of the T-shaped connecting rod has a first U-shaped clamping portion; and an upper part of the reinforcing rod is connected to a vertical part of the T-shaped connecting rod through a rotating shaft, and a lower part of the reinforcing rod has a second U-shaped clamping portion; and the first U-shaped clamping portion and the second U-shaped clamping portion are configured to clamp the top of the test wallboard, and are hingedly connected to the plurality of first mounting holes.

2. The pseudo-static test device of claim 1, wherein in the case that each of the at least two first connecting holes is boltedly connected to the second connecting hole, and the third connecting hole of one of the two steel columns and the third connecting hole of the other of the two steel columns are respectively boltedly connected to the two first ground anchor holes, the first connection joint assembly is configured to rigidly connect the top of the test wallboard to the steel beam, such that the steel beam, the two steel columns, the two first ground anchor holes together form a four-point rigid-connection structure.

3. The pseudo-static test device of claim 1, wherein the support frame further comprises a detachable beam; two ends of the steel beam each have a detachable connecting part; and the detachable connecting part is configured for fixing to an end of the detachable beam;

a bottom plate of the detachable beam is provided with a plurality of fourth connecting holes and a second connection joint assembly; the plurality of fourth connecting holes are each configured for connection to the second connecting hole via a third flange assembly, so as to realize hinged connection between the detachable beam and each of the two steel columns, or for bolted connection to the second connecting hole, so as to realize rigid connection between the detachable beam and each of the two steel columns.

4. The pseudo-static test device of claim 3, wherein each of the first flange assembly, the second flange assembly and the third flange assembly comprises an upper bearing, a lower bearing and a bolt;

the upper bearing comprises two first vertical mounting plates parallel to each other and a first horizontal mounting plate; the first horizontal mounting plate is fixed to a top end of each of the two first vertical mounting plates; the first horizontal mounting plate is configured for fixing to the steel beam, the two steel columns or the detachable beam;

the lower bearing comprises a second vertical mounting plate and a second horizontal mounting plate; the second horizontal mounting plate is fixed to a bottom end of the second vertical mounting plate; and the second horizontal mounting plate is configured for fixing to the two steel columns or the two first ground anchor holes; and a thickness of the second vertical mounting plate matches a spacing between the two first vertical mounting plates; a surface of each of the two first vertical mounting plates is provided with a first flange connecting hole; a surface of the second vertical mounting plate is provided with a second flange connecting hole; when the second vertical mounting plate is inserted between the two first vertical mounting plates, and first flange connecting holes and the second flange connecting hole are aligned, the bolt is configured to simultaneously connect the first flange connecting holes and the second flange connecting hole to form hinged points.

5. The pseudo-static test device of claim 3, wherein the plurality of fourth connecting holes are distributed on the bottom plate of the detachable beam along a length direction of the detachable beam.

6. The pseudo-static test device of claim 3, wherein the top end surface of the T-shaped connecting rod is provided with the screw hole for connection to the bottom plate of the steel beam or the bottom plate of the detachable beam.

7. The pseudo-static test device of claim 3, wherein the steel beam, the detachable beam and the two steel columns are each axially provided with a plurality of reinforcement ribs.

8. The pseudo-static test device of claim 1, wherein the bottom of the test wallboard is provided with a second mounting hole; two inner side walls of the clamp slot are each provided with a fourth connecting hole corresponding to the second mounting hole; and when the bottom of the test wallboard is embedded in the clamp slot on the clamp base, the fourth connecting hole is boltedly fixed to the second mounting hole.

9. A pseudo-static test method using the pseudo-static test device of claim 1, comprising:
(S1) according to a standard of seismic acceleration, controlling a loading actuator to apply a load to the support frame; wherein the support frame is connected to the test wallboard; and (S2) recording a deformation of the test wallboard or a deformation of a connection joint between the test wallboard and the support frame under the load applied by the loading actuator.

\* \* \* \* \*